(12) United States Patent
Hauser

(10) Patent No.: US 7,036,615 B1
(45) Date of Patent: May 2, 2006

(54) HYDROSTATIC TRANSMISSION CONNECTION APPARATUS

(75) Inventor: Raymond M. Hauser, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

(21) Appl. No.: 10/942,462

(22) Filed: Sep. 16, 2004

Related U.S. Application Data

(63) Continuation of application No. 10/634,356, filed on Aug. 5, 2003, now Pat. No. 6,817,430, which is a continuation of application No. 10/056,570, filed on Jan. 25, 2002, now Pat. No. 6,644,425.

(51) Int. Cl.
*B62D 11/02* (2006.01)

(52) U.S. Cl. ............... 180/6.48; 74/606 R; 74/607

(58) Field of Classification Search ............ 180/6.28, 180/6.48, 291, 305, 307, 308; 74/606 R, 74/607–609, 612
See application file for complete search history.

(56) References Cited

U.S. PATENT DOCUMENTS

| 3,765,258 | A | 10/1973 | Jespersen |
| 4,606,428 | A | 8/1986 | Giere |
| 4,845,949 | A | 7/1989 | Shivvers et al. |
| 5,078,222 | A | 1/1992 | Hauser et al. |
| 5,314,387 | A | 5/1994 | Hauser et al. |
| 5,842,532 | A | 12/1998 | Fox et al. |
| 5,957,229 | A | 9/1999 | Ishii |
| 6,186,028 | B1 | 2/2001 | Shimizu |
| 6,189,410 | B1 | 2/2001 | Inoue |
| 6,283,235 | B1 | 9/2001 | Sporrer et al. |
| 6,336,378 | B1 | 1/2002 | Sporrer |
| 6,401,869 | B1 | 6/2002 | Iida et al. |
| 6,644,425 | B1 | 11/2003 | Hauser |
| 6,662,538 | B1 | 12/2003 | Eavenson, Sr. et al. |
| 2002/0170384 | A1 | 11/2002 | Boyer et al. |

*Primary Examiner*—Lesley D. Morris
*Assistant Examiner*—L. Lum
(74) *Attorney, Agent, or Firm*—Neal, Gerber & Eisenberg LLP

(57) ABSTRACT

A transaxle assembly having at least two transaxle housings for a zero turn or similar vehicle, where both housings mount separate hydrostatic transmissions. A mounting plate is provided to secure to both of the housings to mount the housings to a vehicle frame and if required to seal openings formed in the bottom of both of the housings. The connection plate may include tabs or other structure to secure it to the vehicle frame to increase the ease of assembly of the transaxle unit in the vehicle.

15 Claims, 6 Drawing Sheets

HYDROSTATIC TRANSMISSION CONNECTION APPARATUS

RELATED APPLICATION

This application claims the benefit of and is a continuation of U.S. application Ser. No. 10/634,356 filed Aug. 5, 2003, now U.S. Pat. No. 6,817,430 which is a continuation of patent application Ser. No. 10/056,570 filed on Jan. 25, 2002, now U.S. Pat. No. 6,644,425, both of which are incorporated herein by reference in their entirety.

BACKGROUND OF THE INVENTION

This invention relates to an apparatus used to connect hydrostatic transaxles and, more particularly, a plate or similar structure used to connect a pair of hydrostatic zero turn transaxles for use on a lawn and garden tractor or similar vehicle. Hydrostatic transaxles are known in the art and generally comprise a hydrostatic transmission mounted in a housing with reduction gearing, one or more output axles and other elements. The term transaxle is used broadly to cover both integrated units, where the hydrostatic transmission is in a common housing and oil sump with the gearing elements, and other designs where the transmission may be formed in a separate housing and oil sump.

Zero turn transaxles are also well-known in the art. One well-known design is the Agri-Fab Model 2500 transmission. One embodiment of this design is shown in U.S. Pat. No. 5,078,222. This 2500 transaxle generally uses a pair of hydrostatic transmissions, each of which drives a gear reduction to separately power the two vehicle axles. This arrangement permits the vehicle operator to separately drive the two drive wheels independently of one another. Another known zero turn design in the Eaton Model 751, which uses a pump and motor mounted at right angles to one another, with the hydraulic pump, motor and axle mounted in a housing. Obviously, a vehicle requires a pair of such zero turn units mounted side by side to drive the two drive wheels, and the general shape and configuration of the transaxle housing is dictated primarily by the size and shape of the vehicle frame, and similar factors.

Zero turn transaxles are generally manufactured separately from the vehicles and sold to a vehicle manufacturer for incorporation into the vehicle, such as a lawn mower or similar product. The vehicle manufacturer will generally create custom mounting arrangements to mount the zero turn transaxles separately on the vehicle frame. Each custom mounting arrangement requires costly tooling and can increase the difficulty of assembly for the vehicle manufacturer.

In addition, when two units are mounted side by side and secured to the vehicle frame at the top of the transaxle housing, there is inherently certain torque applied to the units, causing the units to flex with respect to one another, which leads to unnecessary stress and wear on various components. In such designs it has been known to provide an additional member to connect the two units together to prevent such flexing. This additional member also increases the cost of the unit.

SUMMARY OF THE INVENTION

It is an object of the invention to eliminate such problems by providing a single plate device on which both zero turn transaxles can be mounted. Such hydrostatic transaxles may have at least one cap plate on the bottom of the transaxle housing. In one embodiment, the connection plate itself forms an integral part of the two transaxle housings to close off a portion thereof, thereby eliminating the need for an additional cap piece and reducing the overall cost and weight of the unit. In a further embodiment of the invention this plate is secured to two separate and complete transaxle housings.

In a preferred embodiment of this invention, the connection plate is formed of stamped steel, which would have sufficient strength to act as a skid plate for the transaxle assembly, thus eliminating the need for such an additional piece.

A further benefit of this invention is that the two transaxle units can be assembled together with the connection plate, thus simplifying later assembly of the unit.

DETAILED DESCRIPTION OF THE DRAWINGS

Figure 1:
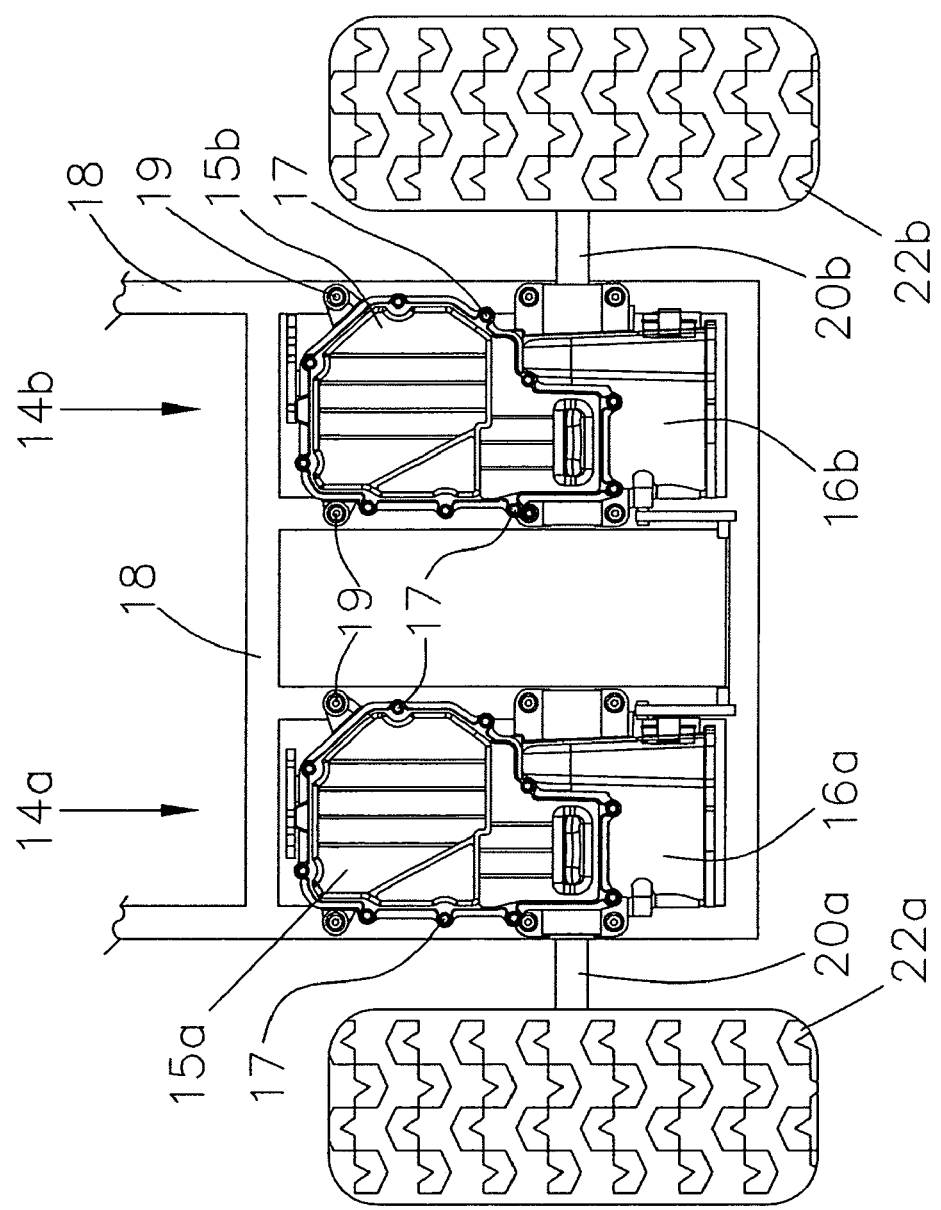
FIG. 1 is a plan view of a back portion of a vehicle incorporating a prior art design of a zero turn transaxle assembly.

FIG. 1 shows a prior art design of a vehicle having a pair of zero turn transaxles 14a and 14b including housings 16a and 16b, respectively, secured to a vehicle frame 18 through a plurality of bolts 19 or similar fastening means on housings 16a and 16b. Transmissions 14a and 14b each drive an axle 20a and 20b which are secured to wheels and tires 22a and 22b respectively. In the design shown in FIG. 1, each of the cap plates 15a and 15b are secured to the bottom of the housings 16a and 16b through a plurality of bolts 17 or similar fasteners. The openings in the housings 16a and 16b are generally used for assembly of the hydrostatic units; such openings are not required, nor is it required that such openings be formed at the bottom of the transaxle housing, as other housing designs could be used. For example, it is also known to form transaxle or transaxle casings of two main casing portions joined together along a split line.

Figure 2:
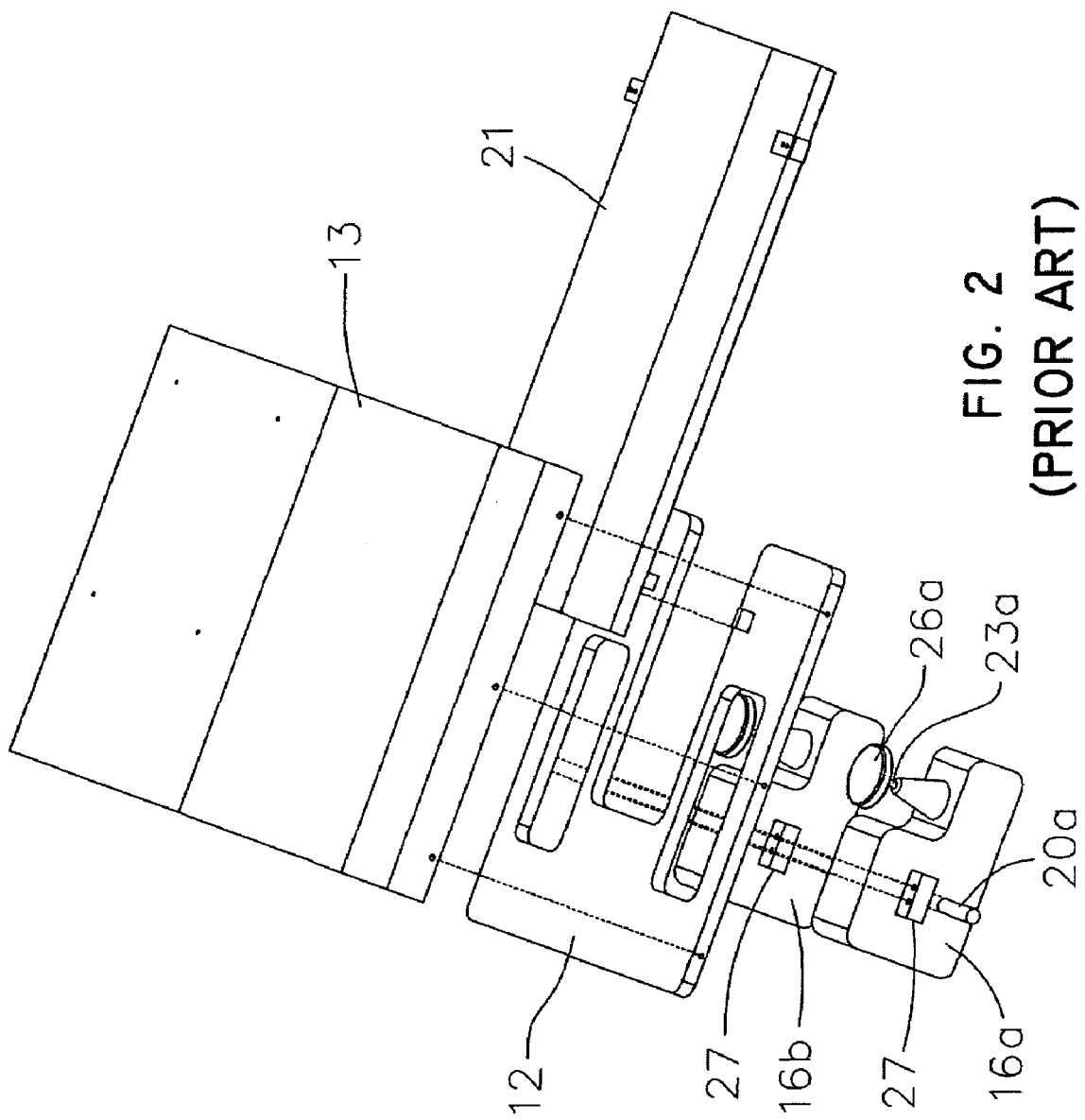
FIG. 2 is a an exploded perspective view of a simplified version of another prior art zero turn transaxle design.

FIG. 2 shows another prior art arrangement, showing transaxle housings 16a and 16b in a simplified view of a typical application to more clearly show the connection to the vehicle frame and related elements, including transaxle mounting plate 12, engine cowling 13 and front frame member 21. In this prior art design, tabs 27 are formed on both sides of each housing 16a and 16b to permit them to be bolted or otherwise secured to mounting plate 12. Only the inboard tab 27 is shown on housing 16b and the outboard tab 27 is shown on housing 16a; it will be understood that matching tabs are present on the other side of each housing. Plate 12 may also be secured to housings 16a and 16b at the front portions thereof. As can be seen, both of the housings 16a and 16b will need to be separately bolted to mounting plate 12 during assembly; frame elements 12, 13 and 21 are all secured together in the embodiment shown.

However, this design does not provide sufficient rigidity to prevent flexing of the two transaxle units 14a and 14b with respect to each other. For example, there is insufficient rigidity to prevent rotation of axle 20a about an axis parallel to the length of the transaxle housings 16a and 16b and located approximately at the outboard tabs 27. As the vehicle traverses uneven ground the axles will tend to flex about these axes, putting stress on mounting locations and other portions of the vehicle, risking fatigue and loosening of fasteners. Thus, even though housings 16a and 16b are attached to plate 12 in at least four locations, there is insufficient rigidity to prevent flexing of mounting plate 12. One known solution is to create a boss on the bottom of both of the transaxle housings 16a and 16b and have a rod connecting one housing to the other; however, this causes additional expense and difficulty in assembly.

Figure 3:
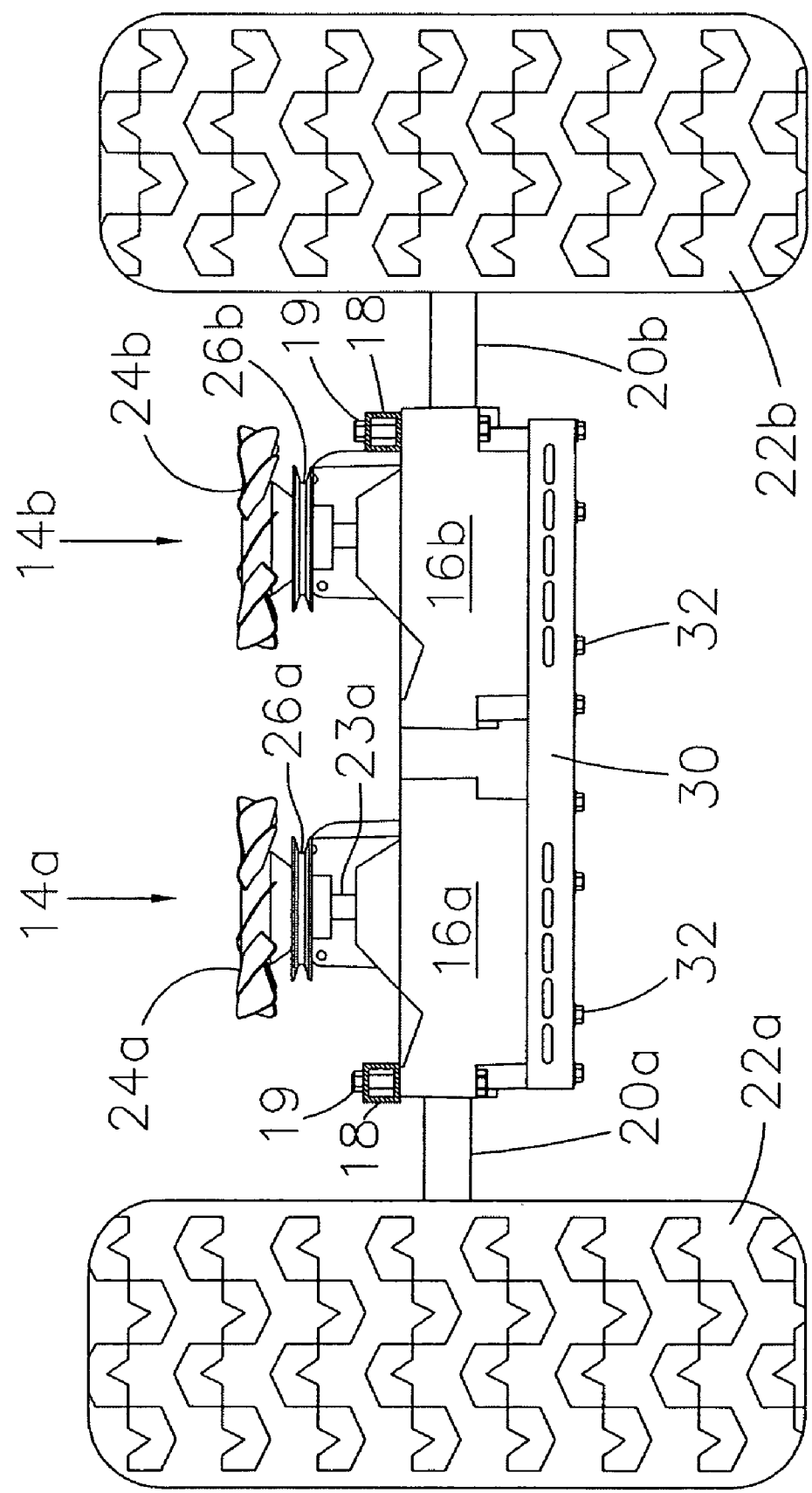
FIG. 3 is a front view of a portion of a vehicle frame and a zero turn assembly in accordance with the present invention.

FIG. 3 shows a zero turn transaxle assembly in accordance with one embodiment of the present invention. As in the prior art, transaxles 14a and 14b each include housings 16a and 16b, respectively, which are secured to rails of vehicle frame 18 at the top portion thereof through bolts 19. This discussion will focus on transaxle 14a; it will be understood that these comments will apply equally to the corresponding transaxle 14b. Transaxle housing 16a includes a hydrostatic pump (not shown) which is driven by pump input shaft 23a by means of pulley 26a. The details of the inner workings of the hydrostatic transaxle are not important to the invention and it will be understood that this invention could also be applied to other designs. It will be understood that the hydraulic pump and motor operate together to drive output axle 20a. A control arm (not shown) is used to control the output and direction of the hydrostatic transaxle and in one known design, the control arm would control a swash plate to control the hydraulic output of the pump. Other known control methods could be used. Cooling fan 24a is also driven by pulley 26a to provide cooling for the unit.

Figure 4:
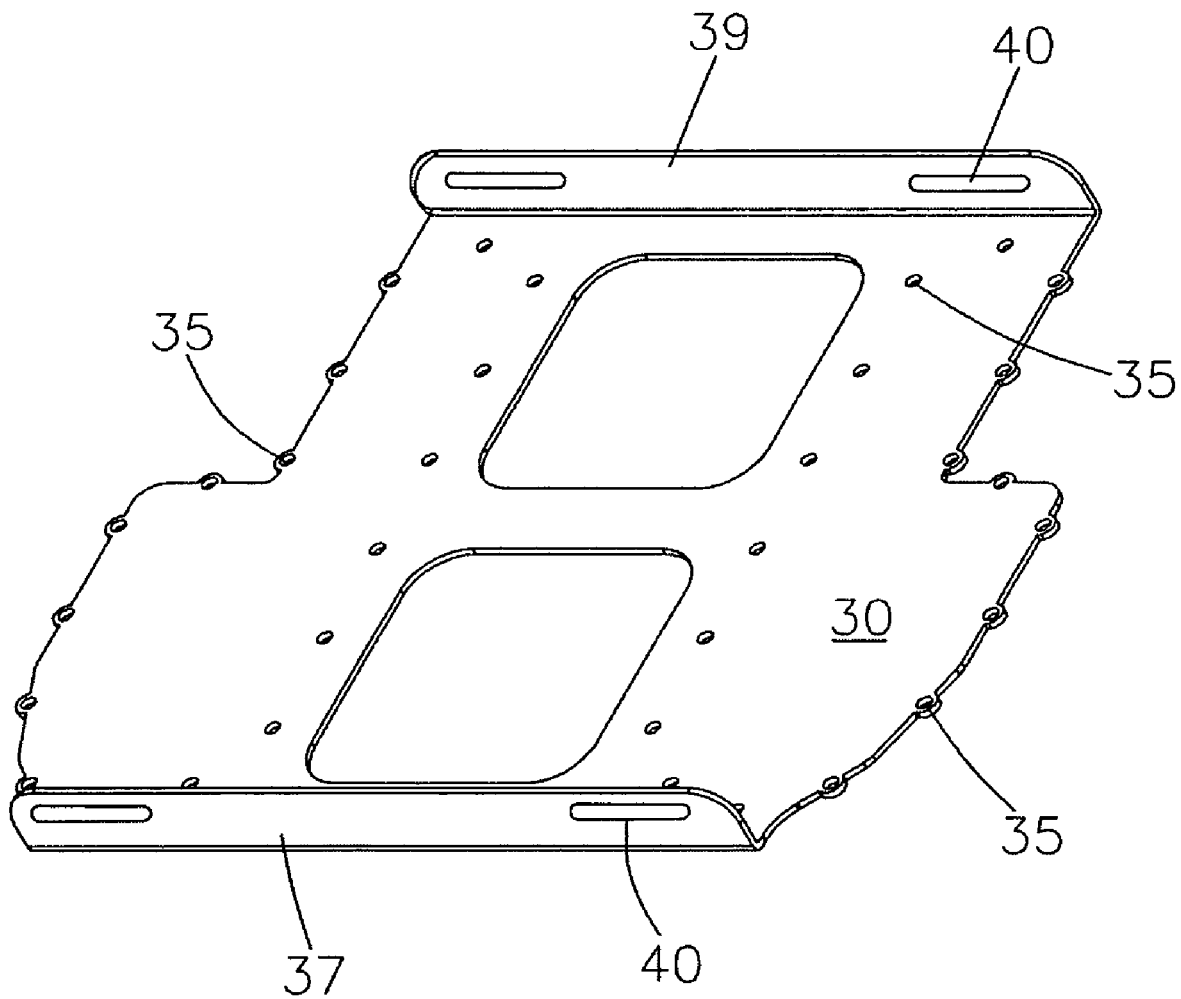
FIG. 4 is a perspective view of one embodiment of a connection plate of the present invention.

As shown in FIGS. 3 and 4, plate 30 is secured to both of the housings 16a and 16b through a plurality of bolts 32 or similar fasteners mounted through mounting holes 35 which can be formed at various places on the plate. Plate 30 acts to seal openings in the respective transaxle housings, thus replacing the separate cap plate used in prior art designs. The necessary seals can be used to prevent the leakage of hydraulic fluid. It is preferred to use a liquid sealant/adhesive to create this seal, but a formed or cut gasket would also suffice. Plate 30 may also include a front tab 37 and rear tab 39 to increase the rigidity of the plate by adding a strengthening rib between the transaxles, to reduce flexing between transaxles 14a and 14b. Tabs 37 and 39 optionally can include a plurality of mounting slots 40 for securing the plate 30 to vehicle frame 18; these slots permit a wide range of mounting possibilities to permit use with different manufacturers' designs. This permits the use of a single plate design with multiple transaxle or vehicle frame designs, eliminating the need to custom-design these plates.

Figure 5:
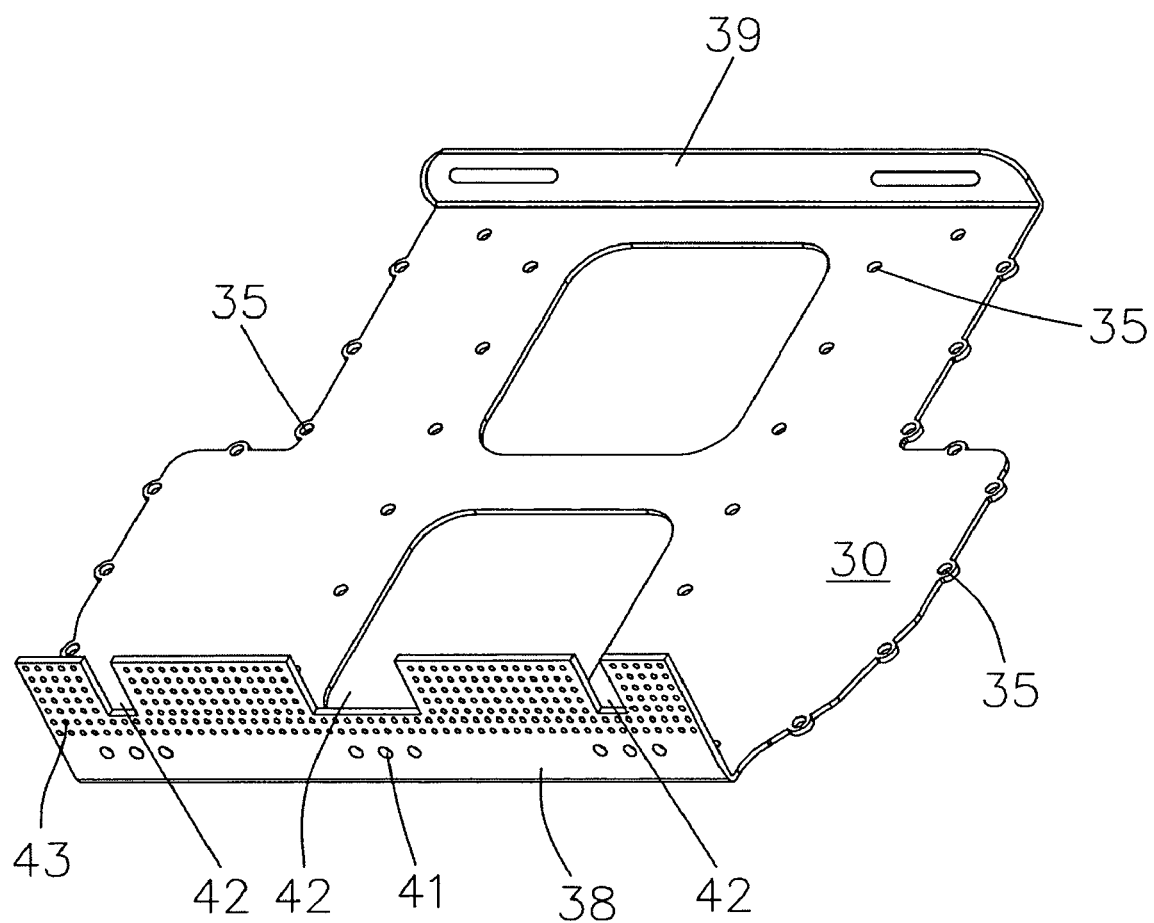
FIG. 5 is a perspective view of a second embodiment of a connection plate of the present invention.

FIG. 5 shows an alternative embodiment of plate 30, where front tab 38 is enlarged to act as a debris shield to protect the transaxles from debris that may be kicked up by the vehicle or from other sources. Additional debris shields could be formed at other places, such as along the sides of the plate, depending on the intended application. Tab 38 also includes a plurality of linkage openings 42 which can be formed at any place along tab 38 as may be required by the shape and size of the transaxle, the vehicle linkages, location of the belts and the like. These openings would preferably be stamped, but other methods could be used. Tab 38 also includes a plurality of vent openings 43 to allow air flow to the transaxle for cooling purposes. The size of these openings would depend on the amount of air flow needed and similar design choices. FIG. 5 also shows that mounting openings 41 can be used in place of slots 40. It will also be understood that the plate could be formed as a solid piece without the various openings other than mounting holes; in such an embodiment it would be preferred to punch small drainage holes in the plate to remove any water that may accumulate there.

Figure 6:
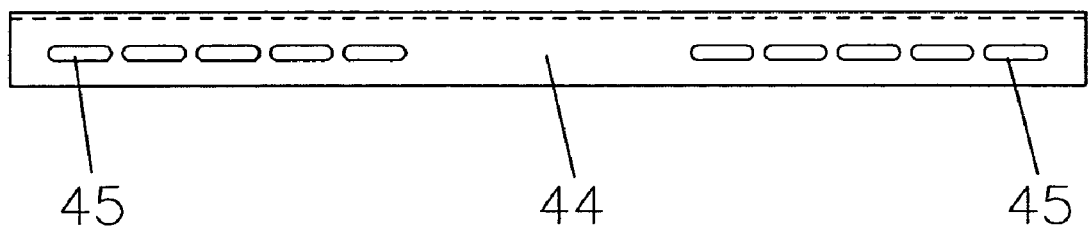
FIG. 6 is an end view of a third embodiment of a connection plate in accordance with this invention.
Figure 7:
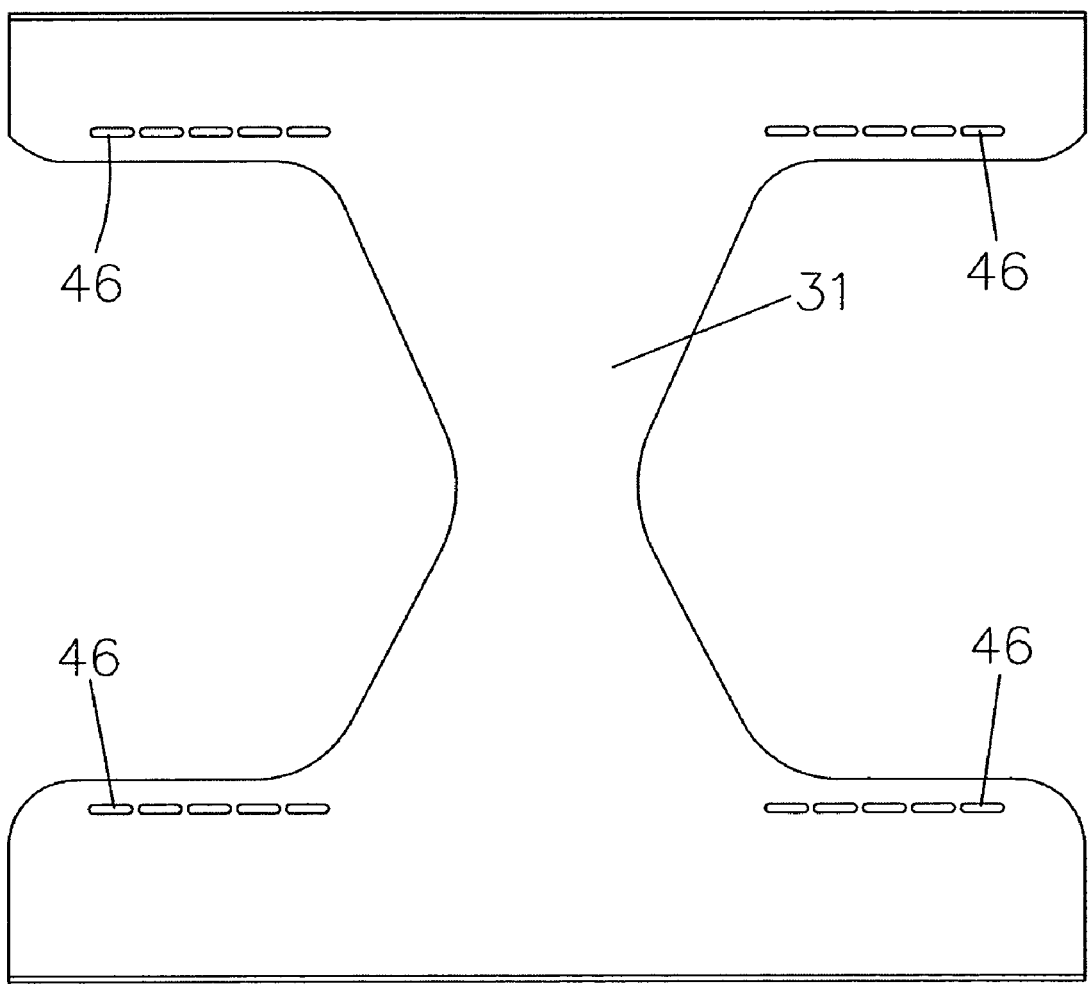
FIG. 7 is a plan view of the connection plate shown in FIG. 6.

FIGS. 6 and 7 show a further embodiment of the invention where plate 31 is not formed to create a cap plate to seal the transaxle housings, but rather is used solely to secure the two housings together. In this embodiment, plate 31 includes a plurality of openings 45 in front tab 44 to secure plate 31 to a vehicle frame. This plate need not be directly secured to the vehicle frame but could also be used simply as a means of strengthening the connection between the two transaxle units. Mounting slots 46 are stamped in the main surface of plate 31 in a variety of locations to provide maximum flexibility for securing it to the transaxle housings in different locations to accommodate different frame widths. The function of mounting slots 46 could also be performed by other features such as multiple holes, welded thread studs or similar features, which could also be used to provide multiple mounting locations. The embodiment shown in FIGS. 6 and 7 does not contemplate the use of the plate to close any openings in the transaxle housings, but rather acts to secure the units together in a unitary mounting package.

It will be understood that the above description should not be read as limiting the scope of this invention, as further features and benefits will be obvious to one skilled in the art. This invention should be read as limited by the claims only.

What is claimed is:

1. A transaxle assembly comprising:
   a first transaxle housing having a first sump formed therein, and a first opening formed in the first transaxle housing;
   a second transaxle housing having a second sump formed therein, and a second opening formed in the second transaxle housing; and
   a connection member secured to both the first and second transaxle housings, wherein the connection member closes the first opening to seal the first sump and closes the second opening to seal the second sump.

2. The transaxle assembly of claim 1, wherein the connection member comprises a plate.

3. The transaxle assembly of claim 1, further comprising a first hydrostatic transmission mounted in the first sump and a second hydrostatic transmission mounted in the second sump.

4. The transaxle assembly of claim 2, wherein the plate further comprises at least one tab extending generally perpendicular to the plate.

5. The transaxle assembly of claim 4, wherein the tab comprises at least one opening.

6. The transaxle assembly of claim 4, wherein the tab comprises at least one slot.

7. The transaxle assembly of claim 1, wherein the connection member further comprises an attachment to a vehicle frame.

8. The transaxle assembly of claim 1, wherein the first transaxle and the second transaxle each comprise generally collinear axle shafts extending away from each other.

9. A vehicle comprising:
   a first transaxle comprising a first housing forming a first sump;
   a second transaxle comprising a second housing forming a second sump;

a vehicle frame to which the first and second transaxle housings are attached, the bottom surface of the vehicle frame generally establishing a first plane; and a plate member attached to the first and second transaxle housings, the plate member establishing a second plane generally parallel to the first plane and substantially separated from the first plane.

10. The vehicle of claim 9, wherein the plate member is attached to the vehicle frame by a connection member.

11. The vehicle of claim 10, wherein the connection member between the plate member and the vehicle frame is generally perpendicular to the first and second planes.

12. The vehicle of claim 11, wherein the connection member is integrally formed as part of the plate member.

13. The vehicle of claim 9, wherein the first transaxle and the second transaxle comprise hydrostatic transmissions.

14. The vehicle of claim 9, wherein the plate member has a plurality of mounting positions in which to attach the first and second transaxle housings.

15. The vehicle of claim 14, wherein the plurality of mounting positions is generally parallel to axle shafts extending from the first and second transaxles.

* * * * *